Dec. 11, 1962  S. G. NEVIUS  3,068,456
RESOLVER DIGITIZING SYSTEM
Filed Nov. 1. 1957  6 Sheets-Sheet 1

INVENTOR.
SEARLE G. NEVIUS
BY
R. E. Geangue
Attorney

Dec. 11, 1962  S. G. NEVIUS  3,068,456
RESOLVER DIGITIZING SYSTEM
Filed Nov. 1, 1957  6 Sheets-Sheet 2

INVENTOR.
SEARLE G. NEVIUS
BY
R. E. Geauque
Attorney

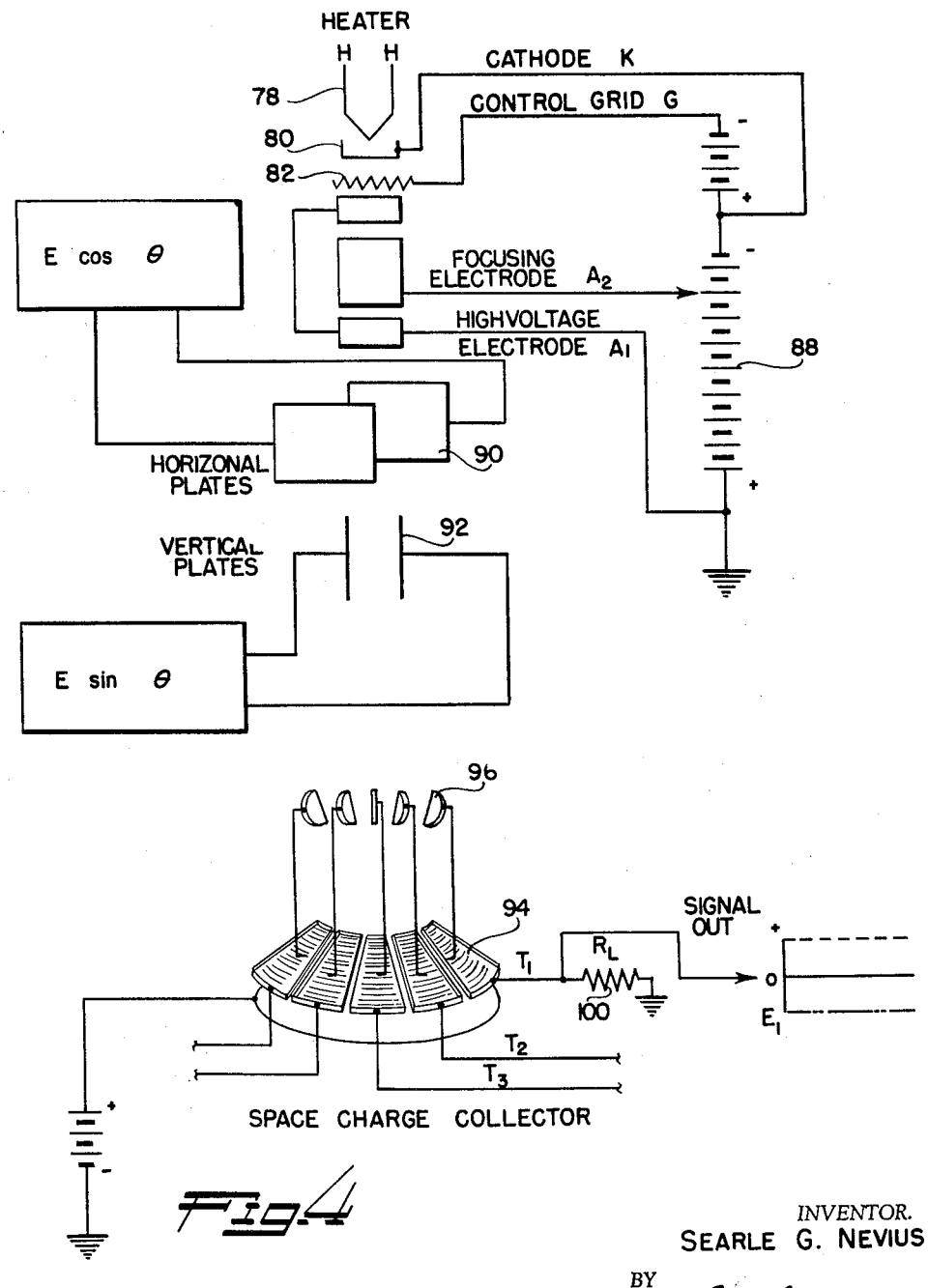

Dec. 11, 1962  S. G. NEVIUS  3,068,456
RESOLVER DIGITIZING SYSTEM
Filed Nov. 1. 1957  6 Sheets-Sheet 4
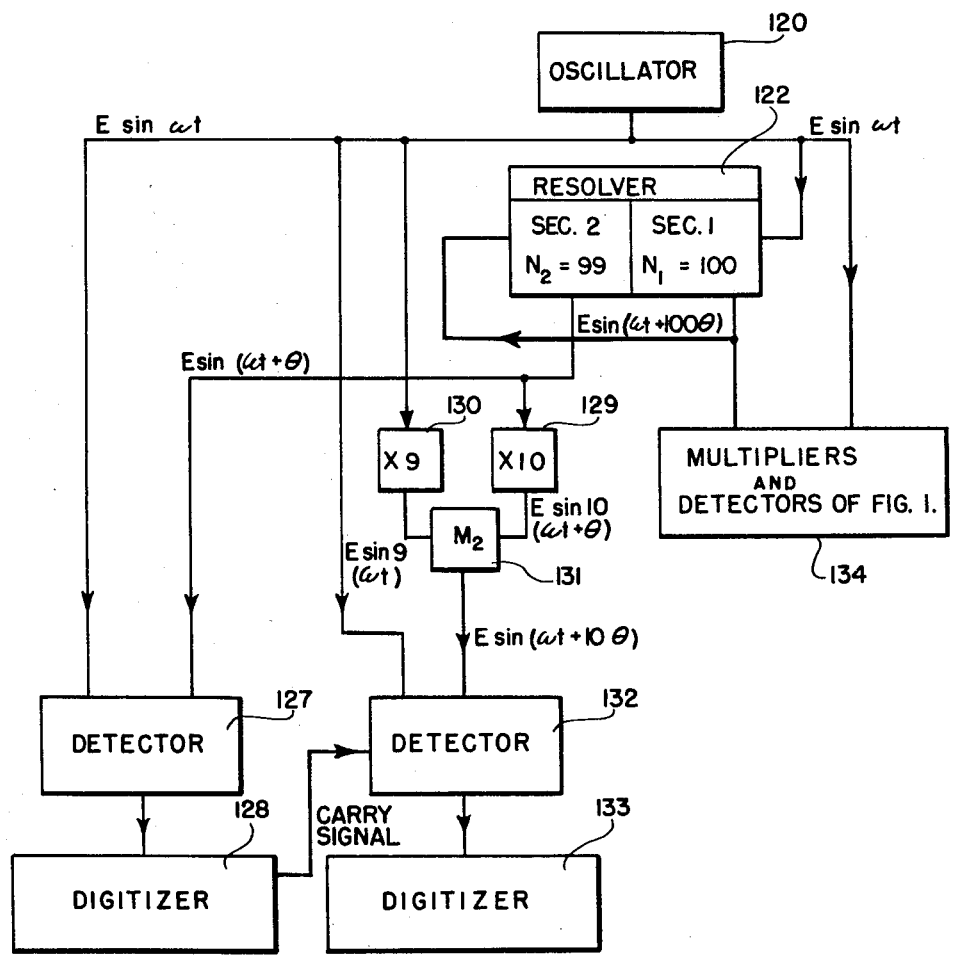
INVENTOR.
SEARLE G. NEVIUS
BY R.E. Geanque
Attorney

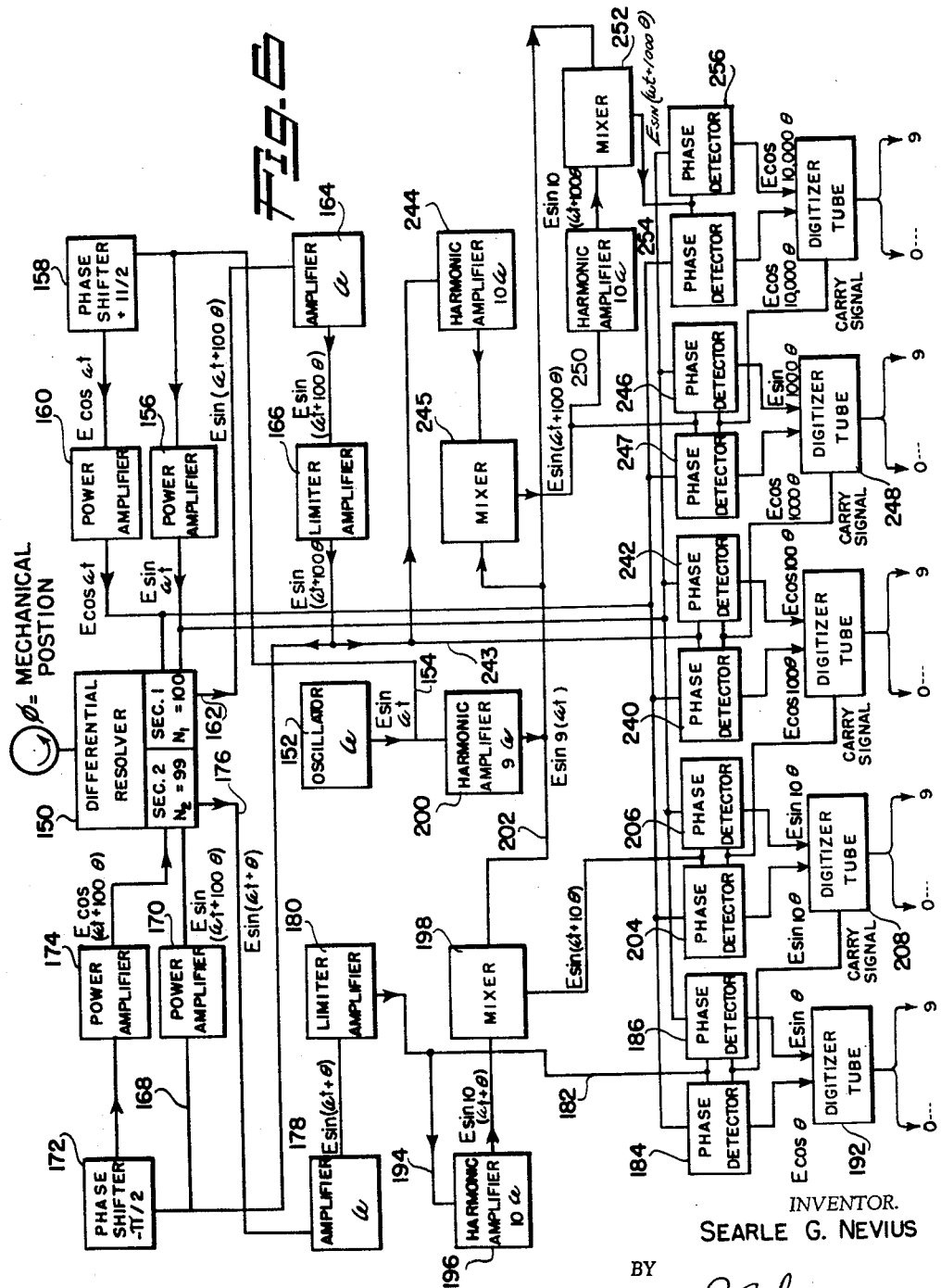

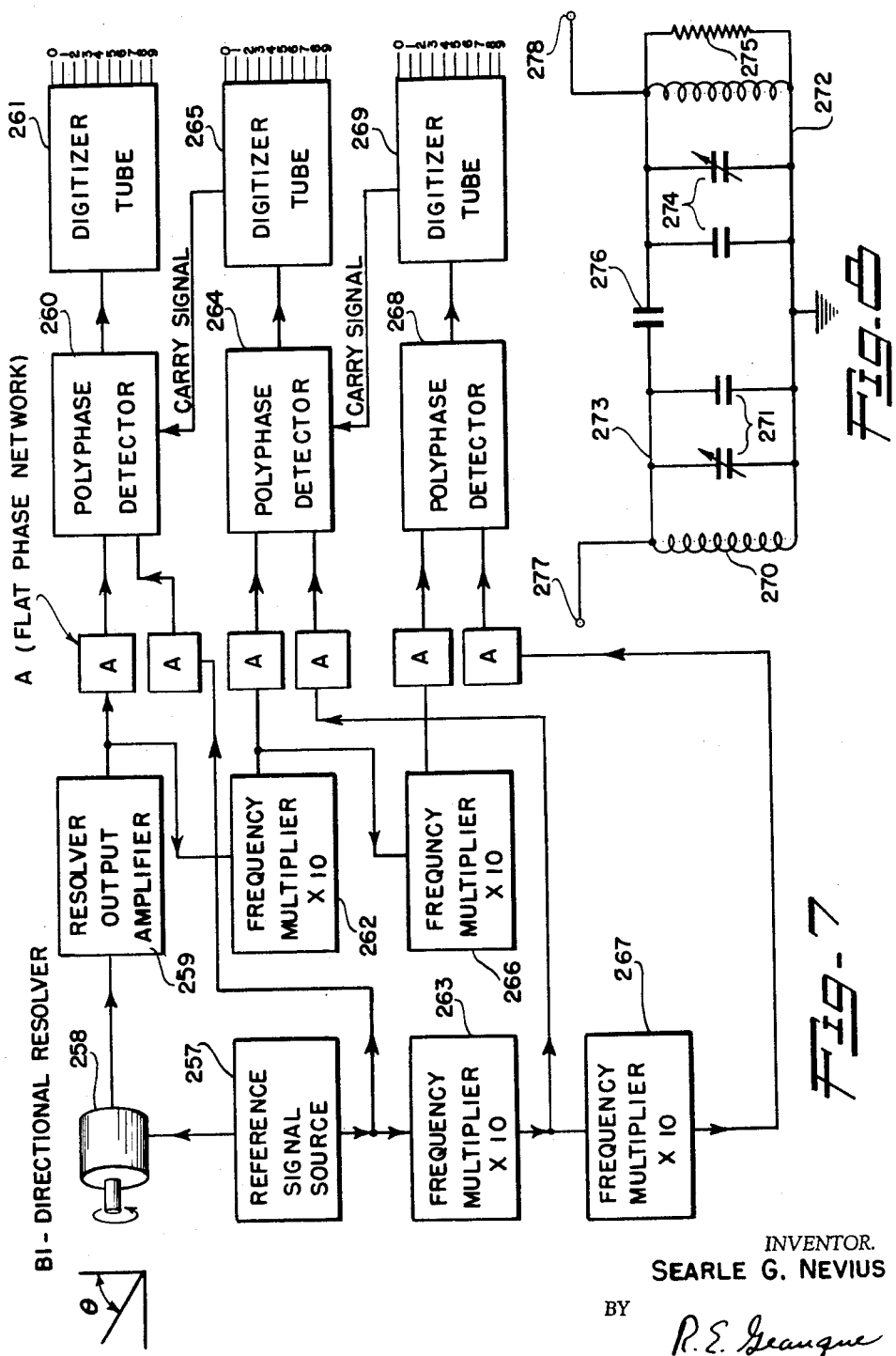

3,068,456
Patented Dec. 11, 1962

3,068,456
RESOLVER DIGITIZING SYSTEM
Searle G. Nevius, Tujunga, Calif., assignor to Telecomputing Corporation, North Hollywood, Calif., a corporation of California
Filed Nov. 1, 1957, Ser. No. 693,930
15 Claims. (Cl. 340—178)

This invention relates to a position resolution system and more particularly to an alternating current or continuous wave system for accurately measuring angles of shaft rotation or linear displacements by phase measuring techniques.

It is known that angular rotation or linear displacement information can be transmitted between two remote stations by using two sine waves having the same frequency but differing in phase. In such a system one of the sine waves serves as a reference signal while the other is adjusted to have a relative electrical phase displacement proportional to the physical displacement to be measured. The electrical phase difference between the two sine waves is measured by a phase detector circuit which produces signal proportional to the electrical phase difference. While theoretically this system would seem to work very well, actual practice has shown that variations in the wave form and non-symmetry in the circuits produces an output signal having insufficient precision to allow division of a shaft rotation or linear displacement into a large number, as for example one hundred thousand, or more, parts, with an accuracy of plus or minus one part, as is desirable for certain types of research and engineering activities.

The system of the present invention involves novel phase measuring techniques and can be used with any one of several different types of resolvers to provide a satisfactory solution to the foregoing problems. The electrical phase delay caused by the resolver is transmitted into several electrical signal channels with the electrical phase angle being multiplied by a different factor in each channel. Each channel is provided wtih a phase detector and the D.-C. signal from the phase detector in each channel is applied to equipment which is used to produce a signal proportional to a separate digit of a multi-digit number. In this manner each phase detector is required to divide the 360° of the sine wave into no more parts than the radix of the counting system used, which in the embodiment illustrated is ten.

The output signal from the phase detectors can be used in a variety of different ways to provide a visual display of the displacement information or to operate control equipment. By using a novel digitizing tube of the electron beam type, the displacement information is directly digitized in a single element and the system is characterized by an inherent synchronization between the analog mechanical input and the electrical digtal output without reference to an accumulated count. The digital indication is therefore determined by the electrical phase difference between the sine waves and the indication does not change when the equipment is again energized after being turned off.

It is accordingly a major object of this invention to provide an improved position indicator for precisely measuring the displacement of an object in space.

It is another object of this invention to provide a system utilizing a phase comparison between two continuous electrical signals for providing precise measurements of distances or angles of rotation.

Still another object of the invention is to provide a phase expansion system for more accurately indicating the exact electrical phase displacement between two continuous electrical signals.

A further major object of this invention is to provide a system which has an output signal in a numeric or digital form for precisely indicating the displacement of an object in space.

A still further object of this invention is to provide for selective phase expansion of the signals in various channels with each channel providing a single digit of a multi-digit number.

Another major feature of the present invention resides in the use of a resolver having different gains and combining their output signal to provide the coarse digital indication.

Another object of the present invention is to make use of a resolver capable of producing two output signals, one being a coarse output signal and the other being a fine output signal, wtih the coarse signal providing the most significant digit in a multi-digit member and the fine output providing a lesser significant digit in a multi-digit member.

Still another object of the invention is to provide a phase expansion system for both the coarse output and the fine output from the resolver.

A still further object of the invention is to provide a phase expansion system capable of dividing a one inch distance into ten thousand or more distinct parts and which only requires a resolver construction accuracy of approximately the square root of one ten thousandths of an inch.

These and other objects of the invention will become more fully apparent from the attached specification and claims and the appended drawings wherein:

FIGURE 4 is a diagrammatic view of a digitizing tube which may be used in the present system;

FIGURE 5 is a block diagram showing one arrangement for obtaining coarse digital indications; and FIGURE 6 is a block diagram of a preferred form of the complete system.

FIGURE 7 is a block diagram of an alternative form of a phase expansion circuit.

FIGURE 8 is a circuit diagram of a flat phase network which may be used in the system.

A complete system according to the present invention includes a number of component parts each of which may be physically realized in many different and varying forms determined by such conditions as the nature of the position to be resolved, the degree of resolution required, the response rate required, the form of output required and the operating conditions imposed.

To clarify some of the terms used in the specification and claims the following definitions are set forth:

*Accuracy.*—the quality of correctness of freedom from error, and is distinguished from "precision" which refers to a measure of reproducibility and closeness to true value.

*Digitizer.*—a means for imparting a dimensional quantity into finite groups by combining, or limiting as to extent.

*Pole pair.*—any two adjacent regions of pronounced flux intensity having exactly the same strength but opposite polarity.

*Resolver.*—a device for both transducing and breaking a vector quantity into parts.

*Resolution.*—a measure of the smallness of an angle or linear distance which can be recognized.

*Real-time operation.*—a term used to describe the rate of a process (data processing) wherein said rate is equal to the rate of production of the raw data and is for all practical purposes coincident in time.

Figure 1:
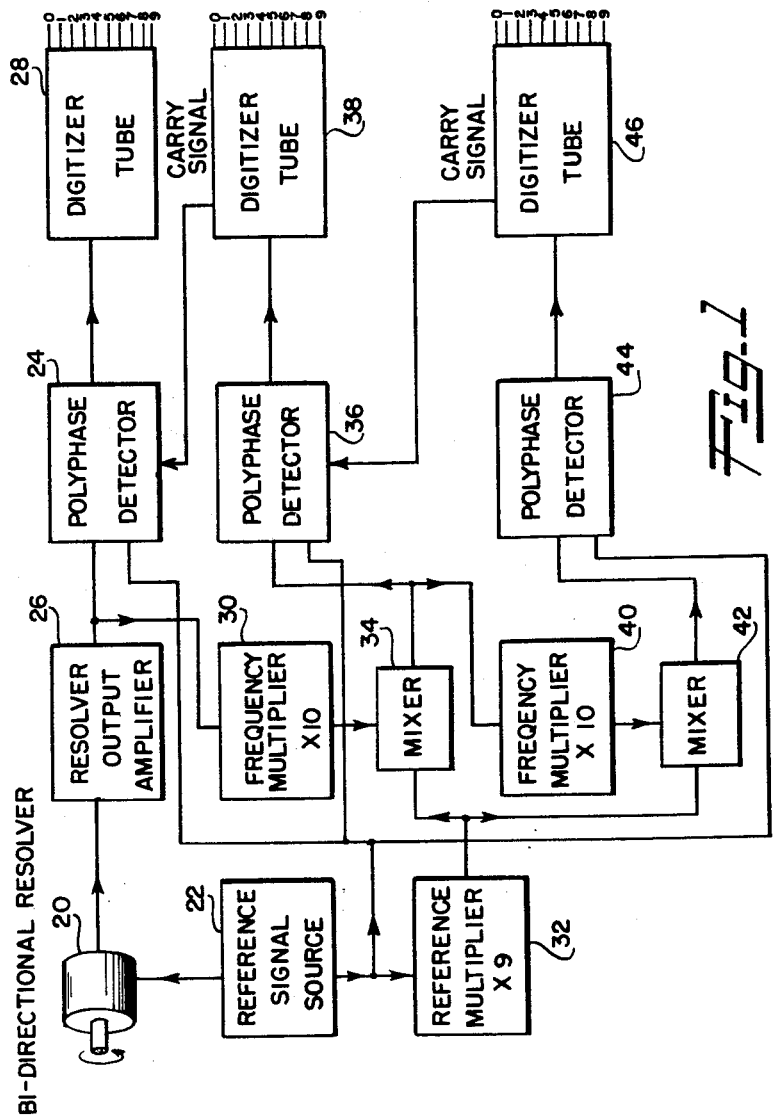
FIGURE 1 is a block diagram of a phase expansion circuit.

A system utilizing the basic principles of the present invention is illustrated in FIGURE 1 and includes a resolver 20, an oscillator 22, and phase detector 24.

Resolver 20 may be of any suitable type and examples are disclosed in United States Patent Nos. 2,671,892 to Childs and 2,674,729 to Carter. Ordinarily such resolvers include electrical conductors on both a fixed element and a movable element which are inductively and/or capacitively coupled together. A source 22 of the electrical signals having constant frequency and amplitude is connected to an input conductor on resolver 20 and an output signal of the same frequency but displaced in phase by an amount proportional to the mechanical input angle is produced at an output terminal.

The output signal from resolver 20 is applied as one input to a phase discriminator or detector 24 and the undelayed reference signal from source 22 is applied as the other input. Amplifier 26 may be used to provide the proper amplitude of signal to detector 24.

A static D.-C. output signal is obtained from detector 24. The magnitude of this signal is proportional to the phase difference between the two input signals applied to detector 24 and is applied as an input signal to a digitizing means 28.

High accuracy in any system comparing the phase displacement between two sine waves requires sine waves having very little distortion and the difficulties encountered in the physical construction and the electrical operation of the various circuit elements involved makes it impractical to even consider the possibility of dividing the output signal from a single phase detector into one hundred thousand uniform parts.

According to the present invention, the extremely high accuracy is obtained by phase expansion or multiplication of the phase angle based on generation of harmonics by a non-linear device. Upon modulation of a signal of the form $\sin(wt+\theta)$ by a non-linear device or frequency multiplier 30 in FIGURE 1 whose output current may be expressed by a Taylor Series Expansion, the $n$th harmonic is obtained by the expansion of $\sin n(wt+\theta)$. This results in a term containing a constant coefficient and $\sin n(wt+\theta)$.

Since $\sin n(wt+\theta)=\sin(nwt+n\theta)$ and $\theta$ is the phase difference between the output signal from resolver 20 and reference signal source 22, mixing the $n$th harmonic with the $(n+1)$th harmonic will produce a signal having a component $\sin(wt+n\theta)$. This component when obtained from the signals from multiplier 30 and 32 at mixer 34 is applied to detector 36 and digitizer 38 to produce the second most significant digit.

Further multiplication of the output signal from mixer 34, which is in the form $\sin(wt+n\theta)$, by the same factor of $n$ produces a signal represented by $\sin(nwt+n^2\theta)$. By mixing this signal with the output from frequency multiplier 32, the input signal to phase detector 44 is $\sin(wt+n^2\theta)$. The output from phase detector 44 applied to digitizer 46 therefore is proportional to the third most significant digit in the number.

Several different types of rotary and linear displacement resolvers can be used in this system including goniometers, selsyns, slotted lines and a variety of printed circuits having one stationary and one movable part. Each resolver can be made to yield a signal $\sin(wt+\theta)$ where $\theta$ is proportional to the displacement of the movable element. This is clearly shown in the case of slotted balanced transmission lines having no standing waves. The phase of the signal received by the movable probe in the slot is compared with the phase at some fixed point. Other forms of resolvers make use of general equation $\sin(x-y)=\sin x \cos y - \cos x \sin y$.

Figure 2:
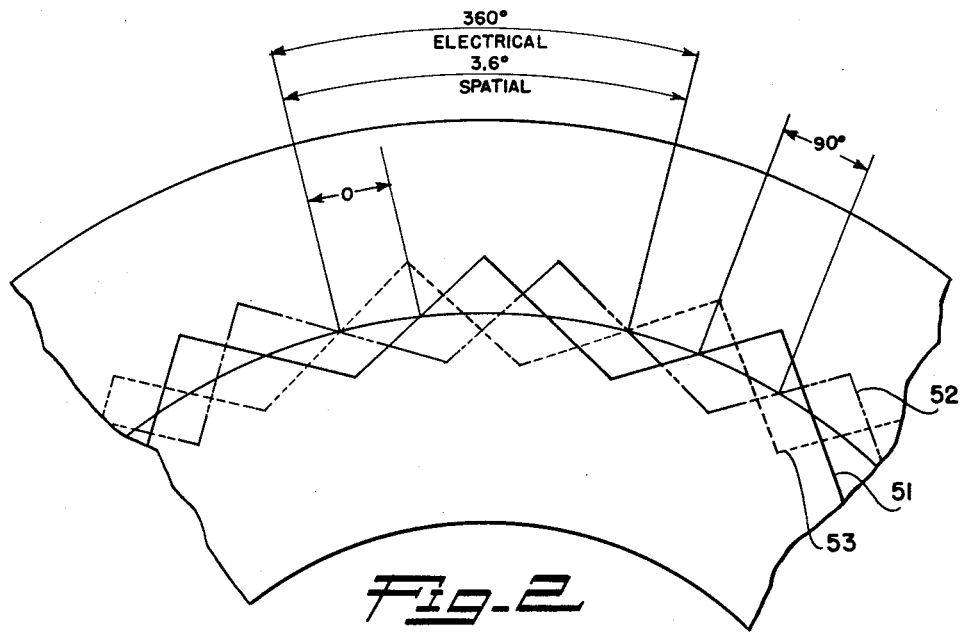
FIGURE 2 is a schematic drawing of the electrical windings of one form of the resolver which can be used in the system according to the invention.

In Patent No. 2,671,892 to Childs, the means for providing a 360° phase shift of the output signal from the resolver for a mechanical rotation of only a few degrees is disclosed. Still another type of resolver capable of dividing 360° of mechanical rotation into a large number of parts is illustrated in FIGURE 2. This resolver consists of a driver component which is ordinarily stationary and a movable or rotatable sensor component. The driver component consists of two continuous electrical conductors 51, 52 geometrically lying in the same plane in a circular path whose distance from the center is periodic about a constant radius. Conductors 51 and 52 have the same period and wave form. Conductor 51 is displaced with respect to conductor 52 by one quarter of a period. Stated differently, conductor 51 is displaced by a phase angle of 90° with respect to conductor 52. The radii of conductors 51 and 52 may be different to eliminate overlapping.

If a common alternating voltage source drives a quadrature phase splitting network whose output is such that conductor 51 is fed with a voltage 90° out of phase with respect to conductor 52, then the currents through conductors 51 and 52 will be 90° out of phase in time at all points along their lengths.

If a third conductor 53 of similar geometrical configuration having the same geometric periodicity is placed on top of conductors 51 and 52, voltages will be induced in conductor 53 by the alternating currents in conductors 51 and 52. The mutual inductances with respect to conductors 51 and 52 will vary with the position of 53 to 51 and 53 to 52 and the E.M.F. in conductor 53 will therefore be a function of displacement, either angular or linear, as well as the magnitudes and phase (time) of the instantaneous currents in conductors 51 and 52.

The function which defines the manner in which the mutual inductance varies with angle may be established by selection of a suitable geometrical relationship between conductors. If the relationship between conductor 53 (hereinafter referred to as "3") to conductors 51 (hereinafter referred to as "1") and 52 (hereinafter referred to as "2" is arranged such that for a given position, the mutual inductance and hence the induced E.M.F. is related to the phase angle $\theta$ in space between conductor 3 and conductor 1 as follows:

E.M.F.$_{3,1}$ is the voltage induced in conductor 3 due to current in conductor 1. E.M.F.$_{3,2}$ is the voltage induced in conductor 3 due to current in conductor 2.

(1) E.M.F.$_{3,1}=f(i_1)H_1 \sin \theta$
(2) E.M.F.$_{3,2}=f(i_2)H_2 \cos \theta$
 $H_1$, $H_2$ are constants depending on geometry
 $H_1=H_2=H$ by geometrical symmetry
 $i_1$=instantaneous current in conductor 1
 $i_2$=instantaneous current in conductor 2
(3) Then E.M.F.$_{3,1}$+E.M.F.$_{3,2}=f(i_1)H \sin \theta$
$$+f(i_2)H \cos \theta$$
If $i_1=I_1 \sin wt$ and $i_2=I_2 \cos wt$
 where $I_1$, $I_2$ are the amplitudes of the currents
 and $I_1=I_2=I$
then
$$f(i_1)=\frac{di_1}{dt}=wI \cos wt, \quad f(i_2)=\frac{di_2}{dt}=wI \sin wt$$

Since the induced E.M.F. is related to the rate of change of the current.

Substituting the expressions for $f(i_1)$ and $f(i_2)$ in Equation 3

E.M.F.$_{3,1}$+E.M.F.$_{3,2}=HwI \cos wt \sin \theta$
$$+HwI \sin wt \cos \theta = HwI (\sin wt+\theta)$$

If 100 pole pairs exist around the circular disc on which the resolver is mounted, then each pole pair represents in space (6) $\quad \dfrac{360°}{100}$ (Space) pole pairs = 3.6° (Space)

Each pole pair, however, represents 360° of electrical phase change as the sensor component moves over the driver element. Consequently, the existence of the pole pair further divides 3.6° by 360°. Therefore, each degree of phase $\theta$ is equal to:

(7) (Space) (Electrical) $\dfrac{3.6° - .01}{360°}$ of rotation of sensor component with respect to the driver component.

If we define the gain of the resolver by (7) $\text{Gain} = G = \dfrac{\Delta\theta}{\Delta\phi}$ where $\Delta\theta$ is the change in angle in electrical degrees of the sensor and $\Delta\phi$ is the change in the angle of the shaft position then the gain is equal to the number of pole pairs. The angular gain of the resolver is consequently 100.

Figure 3:
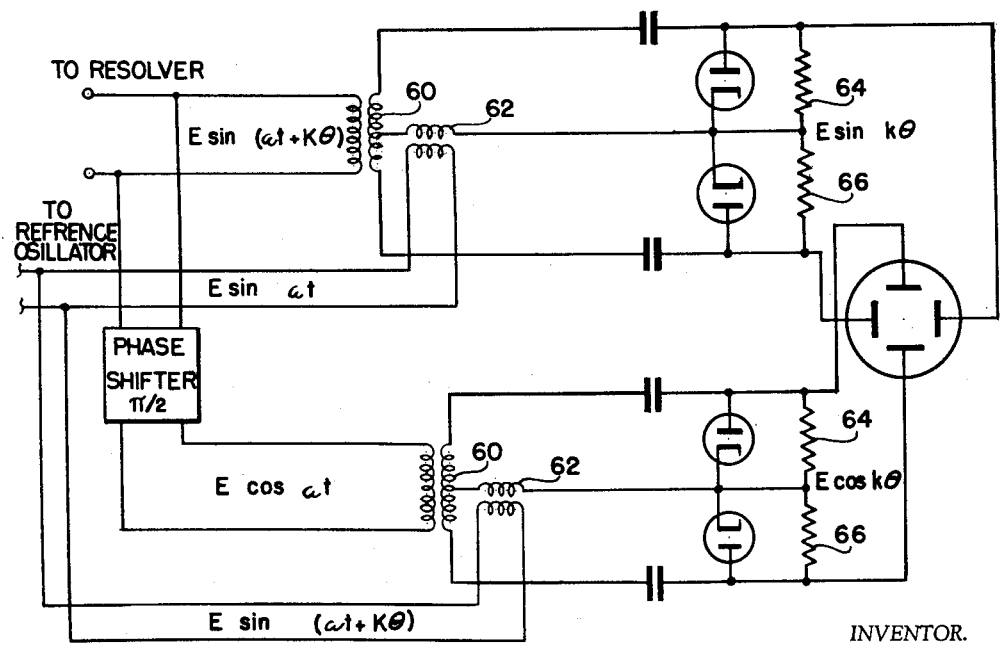
FIGURE 3 is the circuit diagram of a phase detector circuit which may be used in the system.

To retain the sense of direction of displacement in the output signal, a dual or polyphase detector system is used for detectors 24, 36 and 44. An example of such a detector circuit is illustrated in FIGURE 3 which comprises essentially a pair of phase detector circuits which may be of any conventional type connected to produce two output signals that are 90° out of phase when the same input signals are used.

In the illustrated phase detector, coils 60 are center tapped and one end of coils 62 is connected to the center tap. The input signals whose phase difference is to be measured are inductively coupled to the respective coils and the D.C. voltage output obtained across resistors 64 and 66 is proportional to the phase difference between the two input signals.

If reference signal $E \sin wt$ is compared with a signal $E \sin (wt + k\theta)$ from the resolver, then a voltage $E_{out}$ will be generated of the form $E \sin k\theta$.

If the reference signal $E \sin wt$ is shifted 90° and injected into a second phase detecting network and compared with signal $E \sin (wt + k\theta)$ $$E_{out} = E \sin (k\theta + 90°) = E \cos k\theta$$

By means of the quadrature output from the phase shifter, two signals $E \sin wt$ and $E \cos wt$ are produced from the reference carrier. $E \sin wt$ is compared with the intelligence carrier $E \sin (wt + k\theta)$ in one phase detector, and $E \cos wt$ is compared with $E \sin (wt + k\theta)$ in the other detector. The outputs of the detectors are fed to the deflection plates of a cathode ray tube, one signal, $E \sin k\theta$, on the horizontal deflection plates and the other, $E \cos k\theta$, on the vertical deflection plates. In this manner a beam position is established whose angular position is equal to $k\theta$, from a reference point.

Since $\theta$ is continuously variable, $k\theta$ is an analogue quantity. The task of digitizing this quantity is left to the digitizing means. It is sufficient to state here that the tube shown in FIGURE 4 permits the rotation of the beam in discrete steps of $\frac{1}{10} \times 360°$ per step. As the beam rotates in discrete steps, each step has associated with it a unique signal which will be sampled for read-out purposes.

The digitizer means may be any system of type which operates to provide a change in digital indication in response to a change in the signal level of the static D.-C. output signal from phase detector 26. One example is illustrated in FIGURE 11 of United States Patent No. 2,685,082 to Beman and Caldwell. However, the digitizing means is preferably of the type described in FIGURE 4, but may take other forms as desired. This quantitizing or analog to digital conversion is conveniently achieved by a novel cathode ray tube more fully described and claimed in Serial No. 671,816 filed July 15, 1957, now U.S. Patent 2,901,663 in the name of Searle G. Nevius. The cathode ray tube includes the usual elements of an electron gun including a heater 78, cathode 80, grid 82, high voltage electrode 84 and focusing electrode 86 energized by a suitable power source 88.

The input signal is applied to deflection plates 90 and 92 such that the beam circularly scans a ten element target 94 of which only five are shown. Referring to the beam spot position at the target end of the tube there are three fields affecting this position, two of these, the X and Y displacement, position the spot in a circle by means of quadrature input signals from the phase detectors. Just below these fields are ten radially aligned deflection electrodes 96. Each of these electrodes is connected to a corresponding target collector segment 94. These collector segments have the property of emitting secondary electrons due to the impact of the beam. The beam, impinging on a given target segment 94, will cause the charge of that target segment to become positive by reason of the secondary emission from the target. The closed loop to the corresponding deflection electrode 96 will attract the beam and cause it to be bent toward the deflection electrode. The beam will continue to strike the given target segment 94 even to the point where the beam path moves directly opposite the adjacent deflection electrode 96. When the magnitude of the quadrature input signals are such as to move the beam from one target segment to the next, a detent action results since the beam was bent to a location directly opposite the adjacent deflection electrode. The step function or detent action acts the same way regardless of the direction of progress of the electron beam.

The digitizer tube acts as a direct coupled follower of the resolver and, as such, is bi-directional. The maximum digitizing rate of a single tube is limited by the transit time of the electron beam plus the target RC time constants.

To insure that the proper phase relationship exists between the information-carrying inputs to the phase detectors of the various digitizer tubes, means are provided for the insertion of a fixed phase shift on the above inputs to all digital places except the least significant. When the digitized value in a particular digitizer tube is in the second half of its range, a retarding phase shift equal in magnitude to one half of the shift required for a single digit change (in the next higher order digital place) is applied to the information-carrying input of the next higher order digital place. This will prevent the next higher order digitizer tube from changing its digital indication before the next lower order tube changes from 9 to 0 or 0 to 9.

A separate load circuit 100 associated with each target electrode 94 produces a voltage output when the electron beam is associated with that particular electrode and thereby provides an output signal that is in a digital or non-continuous form even though the input is a continuous function. The output may be used to control conventional visual display circuits such as columns of neon bulbs, an electric typewriter, a tape perforator or line printer. As example of a read-out circuit that may be fed by load circuits 100 and energize such equipment is described in Serial No. 271,825 filed February 15, 1952, now U.S. Patent 2,811,310 in the name of W. D. Caldwell and assigned to the assignee of the present invention.

It is thus apparent that the digitizer produces a number of discrete indications equal to the radix of the counting system used. Since human beings are accustomed to use a counting system based on the radix 10, it is convenient to design the digitizer to produce an output consisting of 10 distinct indications for the 360° of mechanical rotation of the movable element in resolver 20.

Since the resolver construction of FIGURE 2 produces 360° of electrical phase shift in the output signal as the sensor component mechanically rotates only $\frac{1}{100}$ of a revolution with respect to the driver component, each pole pair will produce identical phase intelligence. To eliminate need for an accumulative or integrating device indicating the total number of pole pairs traversed, a second drive and sensor element may be connected to the same resolver shaft to produce a coarse output signal in the manner described in Patent No. 2,671,892 or in other suitable fashion. For example, a driver and sensor similar to the 100 pole pair unit described in connection with FIGURE 2 may be used. This similar set, however, contains either 99 or 101 pole pairs in its circuit. In accordance with the equation (7) given above, the mechanical gain of this section of the resolver is 99 or 101 depending upon the number of pole pairs used. By comparing the electrical phase angles of one set with the phase angle of the other as illustrated in FIGURE 5, a course indication is obtained in the following manner.

The output signal from oscillator 120 is fed to the input winding of section 1 of resolver 122. The output signal from section 1 is then also used to power section 2 of resolver 122. The second section of the resolver operates upon the signal supplied from the first section to give an output which may be written (8) $\quad \sin(wt + \theta(n_1 - n_2))$ A digit which is proportional to the mechanical displacement of the movable element and accordingly provides the most significant digit of a multi-digit number may be obtained by a circuit where $n_1 = n_2 + 1$. This is obtained by having, say, 100 pole pairs on section 1 and, say, 99 pole pairs on section 2. Since section 2 has, in this case, one less pole pair than section 1 and because it is powered with the output of section 1 which has 100 cyclical phase revolutions per turn of the input shaft, section 2 will subtract all but one cyclical phase revolution per single turn of the input shaft. Therefore, the output from section 2 will be $E \sin(wt + \theta)$. This signal is supplied to the first order column phase detector 127, together with the reference signal $E \sin wt$ from the oscillator 120. The output from the phase detector 127 is supplied to a digitizer 128 and corresponds to a 360° phase advancement for each single turn of the input shaft.

The output signal $E \sin(wt + \theta)$ from section 2 of the resolver is also supplied to harmonic amplifier 129 where it is multiplied by 10 producing the output $E \sin 10(wt + \theta)$. The reference carrier $E \sin wt$ from the oscillator 120 is supplied to harmonic amplifier 130 where it is multiplied by 9 providing the output $E \sin 9(wt)$. The output from the ×9 multiplier (harmonic amplifier 130) and the output from the ×10 multiplier (harmonic amplifier 129) are combined in mixer 131. The output from mixer 131 may be written $E \sin(wt + 10\theta)$. If this output signal is compared with the reference carrier $E \sin wt$ from the oscillator 120 in phase detector 132, the output from the detector will be the phase angle $\theta$ expanded by a factor of 10. This example illustrates the general method by which the phase angle $\theta$ is expanded by a factor of 10. The hundred's order column digit is obtained from the output signal $E \sin(wt + 100\theta)$ of section 1 of the resolver 122 by means of the multipliers and detectors of FIG. 1 as hereinbefore described and explained. The expansion can be carried out by many different arrangements of which FIG. 5 is illustrated as a preferred form.

In FIGURE 6 differential resolver 150 is similar to the one shown in FIGURE 5 and has two sections one having an electro mechanical gain of 99 and the other having a mechanical gain of 100. Oscillator 152 near the center of the diagram is a constant frequency signal generator whose output is fed through line 154 to power amplifier 156 and through phase shifter 158 to power amplifier 160. The signal output from amplifier 156 is fed to one inductor of section 1 of the differential resolver which has a mechanical gain of 100 and the output from amplifier 160 which is 90° out of phase with the output from amplifier 156 is fed to the other inductor in section 1. An increment of shaft movement of the differential resolver provides at the output of section 1 on lead 162 a signal of the same frequency but having its phase displaced by one hundred times the mechanical displacement of the removable resolver element. This signal is amplified by amplifier 164 and limited in limiter amplifier 166 and then fed through conductor 168 to power amplifier 170 and through phase shifter 172 to power amplifier 174.

It should be understood that the actual wave form is not necessarily a sine wave but is merely a form that can be expressed by a Taylor Series Expansion and that the terms sine and cosine are used to identify the time phase position of the various signals rather than the exact shape of their wave form. The output signals from power amplifiers 170 and 174 are fed to section 2 of differential resolver 150 which has a mechanical gain of 99. By having phase shifter 158 advance the signal in its channel by 90° and phase shifter 172 delaying the signal in its channel by 90°, the differential resolver effectively subtracts the phase delay caused by section 2 from the phase delay caused by section 1 thereby providing an output signal on line 176 whose electrical phase is equal to the mechanical displacement angle of the movable element on differential resolver 150. This simplifies the circuit involved and provides a more stable operation than is obtained by the system shown in FIGURE 5.

The signal on line 176 is accordingly called a "coarse" indication signal and it is amplified by amplifier 178 and limiter amplifier 180. One output of amplifier 180 is fed through line 182 to polyphase detector sections 184 and 186. A second input to phase detector section 184 is obtained from the output of power amplifier 160 through conductor 188. The second input to phase detector section 186 is obtained from the output of power amplifier 156 through conductor 190. This phase detector is of the type illustrated in FIGURE 3 and provides an input signal to the digitizer tube 192 proportional to the most significant digit in a multi-digit member which represents the mechanical phase position of the moveable element of differential resolver 150. As discussed in connection with FIGURES 1 and 2 the exact wave forms applied to phase detectors 184 and 186 are not critical since the digitizer tube only produces an output signal that is accurate to the nearest 36° or one-tenth of 360°.

A second output from limiter amplifier 180 is connected through conductor 194 to a tenth harmonic amplifier 196 whose output is applied as one input signal to mixer 198. The second input signal is obtained from a ninth harmonic amplifier 200 whose output is applied through conductor 202 as the second input to mixer 198. The output signal from mixer 198 is then applied as one input to phase detectors 204 and 206 with the other input to each phase detector obtained from power amplifiers 160 and 156 through conductors 188 and 190 respectively.

The mathematical analysis of the phase expansion and digitizing of the second most significant digit in the coarse indication as given in connection with FIGURE 5 clearly illustrates the principles of phase expansion and the methods of obtaining a decade system. The same philosophy applies to the system arrangement shown in FIGURE 6 but the exact equations are slightly modified because of the circuit connections between the output of section 1 of resolver 150 and the input to section 2.

The third most significant digit in the multi-digit member is obtained by taking the output signal from section 1 of differential resolver 150 as amplified by amplifiers 164 and 166 and applying it directly as one input to phase detector sections 240 and 242. The other input to each phase detector section is the same as used in all of the phase detectors and is applied from power amplifiers 160 and 156.

The fourth most significant digit is obtained from conductor 243 carrying the third most significant digit signal from limiter amplifier 166 and is multiplied in harmonic amplifier 244 where the tenth harmonic is applied as one input to mixer 245. The other input to mixer 246 is the ninth harmonic of the reference signal obtained from amplifier 200 thereby causing the output signal of the mixer to have its phase shifted by a factor of one thousand times the mechanical angular displacement. This signal is applied to phase detectors 247 and 246 to provide the fourth most significant digit at the output of digitizer 248.

The same output signal from mixer 245 is applied to harmonic amplifier 250 which produces a tenth harmonic to be fed to mixer 252. The second input to mixer 252 is also obtained from harmonic amplifier 200 and the phase of the output signal from mixer 252 has been shifted by a factor of ten thousand. This signal is applied to phase detectors 254 and 256 which supply the fifth most significant digit in a multi-digit number.

There has thus been described a system which is capable of reliable operation and which will divide the 360° of a circle of revolution into 100,000 parts. Actual experimental models have been made which produce 200,000 digital counts for one revolution.

The systems described thus far employ heterodyning techniques to provide the phase multiplied signals to the phase detector at the same frequency as the reference carrier frequency. In FIGURE 7 there is shown a system wherein the reference carrier is multiplied by the same factor as the intelligence or phase shifted carrier so that the inputs to the phase detector will be at the same frequency. An oscillator 257 supplies a reference carrier frequency signal to resolver 258 via an input conductor. An output signal is obtained from the resolver having the same frequency but displaced in phase by an amount proportional to the mechanical input angle $\theta$. The output is applied via amplifier 259 as one input to a phase discriminator or detector 260 and the undelayed reference signal from source 257 is applied as the other input. Network A may be used to provide the proper correction for time of transmission through the system as will hereinafter be explained and discussed. A D.-C. amplitude output is obtained from detector 260. The magnitude of this signal is proportional to the phase difference between the two input signals applied to the detector 260 and is applied as an input signal to a digitizing means 261. The phase shifted output from the resolver may be represented as $E \sin(wt+\theta)$ and is multiplied by frequency multiplier 262 to give $E \sin 10(wt+\theta)$. The undelayed reference carrier is multiplied by frequency multiplier 263 to give $E \sin 10(wt)$. The output signals obtained from multiplier 262 and multiplier 263 are applied to detector 264 and digitizer 265 to produce the second most significant digit. Further multiplication of the output signal from multiplier 266 by a factor of 10 produces a signal represented by $E \sin 100(wt+\theta)$. The output from multiplier 267 is similarly multiplied by a factor of 10 to give the reference carrier represented by $E \sin 100(wt)$. The outputs from multipliers 266 and 267 are applied to the inputs of phase detector 268. The output from phase detector 268 applied to digitizer 269 therefore is proportional to the third most significant digit in the number.

In each of the systems described it may, of course, be desirable to record the position of the resolver while its movable element is in motion. If the transmission circuits employed in the system exhibit varying phase shift with frequency, there will be a "velocity error" introduced whenever a reading is taken while the resolver is in motion. The rate of change of phase shift indicates directly the velocity of the movable element in the resolver with respect to the fixed element as a Doppler frequency. A novel four terminal network disclosed in my co-pending application S.N. 693,979 filed 11/1/57, now U.S. Patent 2,965,860 incorporates phase correcting sections having positive phase shifts with changes in frequency which neutralize the negative phase shifts in conventional filter sections to provide a flat phase response over the desired pass band. Referring to FIGURE 8, the first section of this network comprises a primary circuit which is over coupled to a secondary circuit which is in turn connected to a power dissipating load. Considering the current flow in the primary circuit alone, at resonance the lagging current through inductance 270 and the leading current through capacitance 271 are equal and out of phase thereby neutralizing each other. The phase of the output voltage signal will then lead the network input current signal when the frequency is less than the resonant frequency and will lag when the frequency is greater than the resonant frequency. Secondary circuit 272 may be similar to or even identical with primary circuit 273. When the coefficient of coupling exceeds critical coupling the relative phase of voltage across the secondary capacitance 274 as a function of frequency will exhibit a phase lead for frequencies less than resonant frequency, zero phase shift at the resonant frequency, and a lag for frequencies above the resonant frequency. The relative phase shift (as contrasted with relative phase of voltage) for different frequencies of the pass band is always negative and does not reverse. This is a common characteristic for nearly all conventional filter circuits. Primary circuit 273 exhibits an entirely different phase behavior as regards the relative phase shift for different frequencies of the pass band depending upon the degree of coupling. When the primary and secondary circuits are critically coupled, near the resonant frequency the relative phase shift is zero. By increasing the coupling so that primary circuit 273 and secondary circuit 272 are over coupled, the relative phase shift will be positive. Furthermore, the degree of relative positive phase shift is substantially directly proportional to the degree of over coupling and by making the degree of over-couple large the positive phase shift can be made quite large. The positive phase shift is due principally to the power drawn by secondary circuit 272 from circuit 273. By varying resistive load 275 which draws power from the secondary circuit the frequency parameters of the network may be altered, A small coupling capacitor 276 may optionally be used. The input current and the output voltage appear at terminal 277 as the output signal from the network is effectively taken from the primary circuit. A novel four terminal network having flat phase characteristics can be constructed by combining a conventional filter having a negative relative phase versus frequency as first described with a filter section of the type having a positive relative phase versus frequency as last described. One of the filter sections may be connected in series with the line by connection to terminal 278 while the other may be effectively across the line by connection to terminal 277. By controlling the degree of over coupling between the primary and secondary circuits, a four terminal network can be constructed having a zero relative phase shift for a band of frequencies the center of which is substantially the reference carrier frequency of the phase measuring system. Moreover, the amplitude of the signal from the combined sections can also be controlled to be substantially constant over the same band width. Interstage coupling of the various elements of the resolver digitizing or phase measuring system of the present invention may be affected by the flat phase four terminal networks as just described and as shown at the points marked A in FIGURE 7. Velocity errors may thus be cancelled out and real-time digitization of the resolver's position may be accomplished while the resolver is in motion. Other sources of phase versus frequency distortion may also be cancelled out by introduction of the flat phase network into appropriate points in the phase measuring system. References to resolvers in the foregoing paragraphs should be considered to include flat phase shifting networks having selectable terminals to introduce fixed incremental phase shifts into the system. Such presettable networks may be algebraically additive to the output from an angular resolver. This will provide a convenient means for establishing a desired (zero) reference point from which the shaft rotation may be measured. A presettable reference point may be especially desirable in the present invention in that it does not depend upon counting techniques to indicate the relative position of the input shaft. That is, the mechanical input to the resolver shaft may be established while the electronic system is turned off and the correct position of the shaft will be indicated when the power is turned on.

It is to be understood that linear resolvers can be used equally well, and with carefully constructed resolvers, the phase expansion can be carried on considerably further. However, the accuracy of the windings on the resolver must be of the same order as the phase expansion and with a 10 inch resolver winding, the conductor patterns must be located with an accuracy of $1/10,000$ of an inch. By using fine windings or resolvers having significant mechanical gains, the accuracy required for individual conductor positions is only the square root of $1/10,000$ of an inch because the output signal is a statistical average over several individual conductors.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a position indicating system, a source of a cyclically recurring reference signal at a predetermined frequency, a resolver means connected to said source having a plurality of pole pairs to provide a 360° phase shift of said reference signal in response to a physical displacement of said resolver proportional to the pitch of said pole pairs, and digital measuring means connected to said source and said resolver means for indicating the phase shift caused by the displacement of the resolver in discrete increments integrally proportional to the pitch of said pole pairs and thus provide a digital indication of the resolver displacement and means for multiplying the frequency output of the resolver means and a second digital measuring means connected to the output of the said multiplying means.

2. In a position indicating system, a source of a cyclically recurring reference signal at a predetermined frequency, a resolver means connected to said source having a plurality of pole pairs to provide a 360° phase shift of said reference signal for a physical displacement of said resolver proportional to the pitch of said pole pairs, a plurality of signal channels connected to the output of said resolver means, a phase detector in one of said channels, means connecting said reference signal to said phase detector, means digitizing the output of said phase detector, a first frequency multiplier and a second phase detector in a second of said plurality of channels, means connected with said reference signal source for supplying a comparison signal to said second phase detector having a predetermined frequency relationship with the reference signal and of the same frequency as the multiplied frequency output from the first frequency multiplier, and means for digitizing the output of said second phase detector.

3. In a position indicating system, a source of a cyclically recurring reference signal of a predetermined frequency, resolver means fed with signals from said source, said resolver means having two sections, one of said sections having pole pairs of a first pitch whereby the phase of said reference signal will be shifted 360° for a predetermined physical displacement of said resolver, the other of said sections having pole pairs of a second pitch whereby the phase of said reference signal will be shifted 360° for a physical displacement of said resolver equal to a multiple of said predetermined physical displacement, means connected to the output of the first section of the resolver for providing a digital signal proportional to the phase shift of the output signal from said first section, and phase detector and digitizing means, means connected to the output of the second section of the resolver for providing a digital signal proportional to the phase shift of the signal provided by said second section.

4. The position indicating system as defined in claim 3 wherein the output signal from one of said sections is applied as an input signal to the other of said sections.

5. In a position indicating system, a source of reference signals recurring at a predetermined frequency, a resolver means fed with signals from said source, said resolver means having two sections, one of said sections being effective to provide a 360° phase shift of said reference signal for a predetermined physical displacement of said resolver, the other of said sections being effective to provide a 360° phase shift of said reference signals for a physical displacement of said resolver equal to a multiple of said predetermined physical displacement, a plurality of channels connected to the output of the first section of said resolver means, a phase detector in one of said channels, means connecting said reference signals to said phase detector, a first frequency multiplier and a second phase detector in a second of said plurality of channels, means for supplying a comparison signal to said second phase detector having a predetermined frequency relationship with the reference signal and of the same frequency as the multiplied frequency output from the first frequency multiplier, and means for comparing the phase of the output signal from the other section with the phase of said reference signals.

6. In a position indicating system, a source of a reference signal at a predetermined frequency, a resolver means connected to be supplied with said signal, said resolver means having two sections, one of said sections being effective to produce a 360° phase shift of said reference signal for a predetermined physical displacement of said resolver, the other of said sections being effective to produce a 360° phase shift of said reference signals for a physical displacement of said resolver equal to a multiple of said predetermined physical displacement, a plurality of signal channels connected to the output of one of said sections of said resolver means with each of said channels providing as an output a signal proportional to a separate digital order column of a plural order number, a phase detector in one of said channels, means connecting said reference signals to said phase detector to provide a signal proportional to a first of said digits, a first frequency multiplier and a second phase detector in a second of said plurality of channels, means for supplying a comparison signal to said second phase detector having a predetermined frequency relationship with the reference signal and of the same frequency as the multiplied frequency output from the first frequency multiplier, to provide a second signal proportional to a second of said digits, a third frequency multiplier and a third phase detector in a third of said plurality of channels, means to provide the reference signal at a frequency having a predetermined frequency relationship with the output from said third frequency multiplier connected to said third phase detector to provide an output proportional to a third of said digits, and a fourth phase detector connected to the output of the other section of said resolver means and means for connecting the reference signal to said fourth phase detector to provide a signal proportional to the displacement of said other section of said resolver.

7. In a position indicating system, a source of a reference signal at a predetermined frequency, a resolver means supplied with said signals, said resolver means having two sections, one of said sections being effective to provide a 360° phase shift of said reference signals for a predetermined physical displacement of said resolver, the other of said sections having a different number of pole pairs to provide a 360° phase shift of said reference signal for a physical displacement of said resolver equal to a multiple of said predetermined physical displacement, a plurality of channels connected to the output of the first section of said resolver means, each channel providing a signal proportional to a digit of a plural order number, a phase detector in one of said channels, means connecting said reference signals to said phase detector, means digitizing the output from said phase detector, a first frequency multiplier and a second phase detector in a second of said plurality of channels, means for supplying a comparison signal to said second phase detector having a predetermined frequency relationship with the reference signal and of the same frequency as the multiplied frequency output from the first frequency multiplier, means for digitizing the output of said second phase detector, a third frequency multiplier and a third phase detector in a third of said plurality of channels, means supplying the reference signals in a predetermined frequency relationship with the output signal from said third frequency multiplier to said third phase detector, means for digitizing the output of said third phase detector, a plurality of output signal paths connected to said other section of said resolver means, a fourth phase detector in one of said signal paths, means supplying the reference signals to said phase detector in a predetermined frequency relationship with the output signal from said third frequency multiplier, means for digitizing the output of said phase detector, a fourth frequency multiplier and a fifth phase detector in a second of said plurality of signal paths, means supplying the reference signals in a predetermined frequency relationship with the output signal from said fourth frequency multiplier to said fifth phase detector, and means for digitizing the output of said fifth phase detector.

8. A position indicating system as defined in claim 7 wherein the output signal from one section of the resolver is applied as the input signal to the other section of the resolver.

9. In a position indicating system, a source of a reference signal at a predetermined frequency, a resolver means supplied with said signals, said resolver means having two sections, one of said sections having a plurality of pole pairs to provide a 360° phase shift of said reference signal for a physical displacement of said resolver proportional to the pitch of said pole pairs, the other of said sections having a different number of pole pairs to provide a 360° phase shift of said reference signal for a physical displacement of said resolver equal to a multiple of the pitch of said first plurality of pole pairs, a plurality of channels connected to the output of the first section of said resolver means, phase detector and digitizing means in each channel the output of which is a signal proportional to a digit of a plural order number, a plurality of output signal paths connected to said other section of said resolver means and phase detector and digitizing means in each signal path the output of which is a signal proportional to other digits of said plural order number.

10. In a position indicating system, a source of a reference signal at a predetermined frequency, a resolver means supplied with said signals, said resolver means having a stator element and a relatively movable sensor element, said stator and said sensor each having two sections, one of said sections having a plurality of pole pairs to provide a 360° phase shift of said reference signal for a physical displacement of said resolver equal to the pitch of said pole pairs, the other of said sections having a different number of pole pairs and having as an input signal the output signal of the said one section to provide a 360° phase shift of said reference signal for a physical displacement of said resolver equal to a multiple of the pitch of the pole pairs in said first section, separate output channels for each of said sections, separate signal paths in each of said output channels, one signal path in each channel having a phase detector means the output of which is a signal corresponding to the phase shift of the signal in its respective section of the resolver, and a second signal path in each channel having a frequency multiplying means the output signal of which corresponds to a fractional part of the displacement of the sensing element in its respective section of the resolver.

11. The position indicating system as defined in claim 10 having digitizing means connected to the outputs from each of said signal channels.

12. A position indicating system comprising a source of a cyclically recurring reference signal at a predetermined frequency, a pair of signal channels connected with said source, resolver means in one of said signal channels for shifting the phase of said signal in said one channel by an amount proportional to the physical displacement of said resolver, means for comparing the phase-shifting signal in said one channel with said reference signal in the other of said channels, a digitizing means responsive to the phase difference in said comparing means to provide a continuous indication of the physical displacement of said resolver in discrete increments, and means connected with the output signals of said channels for multiplying the phase shift between said output signals supplied to said comparing means, and another digitizing means responsive to the multiplied phase shift to provide a second order of discrete increments of measurement which are a submultiple of the discrete increments indicated by said first mentioned digitizing means.

13. A position indicating system as defined in claim 12 wherein said means for multiplying comprises means for producing a phase multiplied signal and a comparison signal having a predetermined frequency relationship with said reference signal and having the same frequency as the multiplied phase shift signal.

14. A position indicating system comprising, a source of a cyclical reference signal recurring at a predetermined repetition rate, means connecting said signal to a pair of signal channels, resolver means in one of said signal channels for shifting the phase of the signal in said one channel by an amount proportional to the displacement of said resolver, digitizing means responsive to the outputs of said signal channels for producing a first order digit of a plural order digital manifestation corresponding to the displacement of said resolver, and means for multiplying the phase shift outputs of said signal channels by a factor equal to the radix of said digitizing means for producing a second order digit of said plural order digital manifestation.

15. A position indicating system comprising, a source of cyclically recurring reference signals at a predetermined frequency, resolver means connected to said source having a plurality of pole pairs to provide a 360° phase shift of said reference signal in response to a physical displacement of said resolver means proportional to the pitch of said pole pairs, a plurality of signal channels connected to the output of said resolver means one of said channels having an output which is a multiple of the frequency of another of said channels, and a plurality of digitizing means in corresponding ones of said signal channels, one of said digitizing means being responsive to the output of its corresponding signal channel to provide a digit of a plural order number indicative of the displacement of said resolver means through one pitch distance and another of said digitizing means being responsive to its corresponding signal channel to provide another digit of said plural order number indicative of the displacement of said resolver means through a submultiple of one pitch distance.

References Cited in the file of this patent

UNITED STATES PATENTS 2,402,973   Moore _____ July 2, 1946

(Other references on following page)

UNITED STATES PATENTS

| | | |
|---|---|---|
| 2,542,627 | Chevallier | Feb. 20, 1951 |
| 2,562,682 | Schmitt | July 31, 1951 |
| 2,580,803 | Logan | Jan. 1, 1952 |
| 2,582,957 | Borsum | Jan. 22, 1952 |
| 2,674,729 | Carter | Apr. 6, 1954 |
| 2,685,082 | Beman | July 27, 1954 |
| 2,717,987 | Hagen | Sept. 13, 1955 |
| 2,787,762 | Van Weel | Apr. 2, 1957 |
| 2,788,519 | Caldwell | Apr. 9, 1957 |
| 2,848,711 | Rhodes | Aug. 19, 1958 |
| 2,850,240 | Dickinson | Sept. 2, 1958 |
| 2,898,040 | Steele | Aug. 4, 1959 |